(12) United States Patent
Lin et al.

(10) Patent No.: US 7,181,131 B2
(45) Date of Patent: *Feb. 20, 2007

(54) CHANGING A PLAYBACK SPEED FOR VIDEO PRESENTATION RECORDED IN A PROGRESSIVE FRAME STRUCTURE FORMAT

(75) Inventors: Shu Lin, Indianapolis, IN (US); Jianlei James Xie, Carmel, IN (US); Mark Alan Schultz, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1112 days.

This patent is subject to a terminal disclaimer.

(21) Appl. No.: 09/883,635

(22) Filed: Jun. 18, 2001

(65) Prior Publication Data

US 2002/0191959 A1    Dec. 19, 2002

(51) Int. Cl.
*H04N 7/26* (2006.01)
(52) U.S. Cl. ...................... 386/111; 386/125
(58) Field of Classification Search ............ 386/68, 386/81, 109–112, 124–126, 82, 52, 70, 92, 386/131; 348/386, 390; 360/32, 33, 48, 360/51, 61, 64
See application file for complete search history.

(56) References Cited

U.S. PATENT DOCUMENTS 5,418,658 A * 5/1995 Kwon ........................ 360/48

| 6,014,494 A | 1/2000 | Minechika et al. |
| 6,124,995 A | 9/2000 | Kim |
| 6,621,979 B1 * | 9/2003 | Eerenberg et al. ............ 386/68 |
| 2002/0028061 A1 * | 3/2002 | Takeuchi et al. ............. 386/68 |

FOREIGN PATENT DOCUMENTS

| EP | 0 579 514 | 1/1994 |
| EP | 0 746 156 | 12/1996 |
| WO | WO 99/65239 | 12/1999 |

\* cited by examiner

*Primary Examiner*—Thai Tran
*Assistant Examiner*—Mishawn Dunn
(74) *Attorney, Agent, or Firm*—Joseph J. Laks; Robert B. Levy; Jorge Tony Villabon

(57) ABSTRACT

The invention includes a system and method for changing a playback speed of a selected video segment having a progressive frame structure which has been recorded onto a portion of a storage medium. A selected video segment can be modified for a changed playback speed and the modified video segment can be recorded exclusively on the portion of the medium. A plurality of non-video packs in the selected video segment can be deleted to reduce the amount of data contained in the modified video segment. Alternatively, the resolution of at least one frame in the modified video segment can be reduced. The video segment can contain intra and non-intra frames and can be modified by adding at least one picture. Alternatively, the video segment can be modified by removing at least one picture. The video segment can also be re-encoded for smoother trick mode and playback performance.

26 Claims, 11 Drawing Sheets

GOP$_1$:   B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$

FIG. 4B

GOP$_1$:   B$_0$ B$_1$ I$_2$P$_2$ B$_3$ B$_4$ P$_5$ B$_6$ B$_7$ P$_8$ B$_9$ B$_{10}$ P$_{11}$ B$_{12}$ B$_{13}$ P$_{14}$

FIG. 4C

GOP$_1$:   B$_0$ B$_1$ I$_2$P$_2$ B$_3$ B$_4$ P$_5$ B$_6$ B$_7$ I$_8$ P$_8$ B$_9$ B$_{10}$ P$_{11}$ B$_{12}$ B$_{13}$ P$_{14}$

FIG. 4D

GOP$_1$:   B$_0$ B$_d$ B$_1$ B$_{d1}$ I$_2$P$_2$ P$_{d2}$ B$_3$ B$_{d3}$ B$_4$ B$_{d4}$ P$_5$ P$_{d5}$ B$_6$ B$_{d6}$ B$_7$ B$_{d7}$ I$_8$ P$_8$ P$_{d8}$ B$_9$ B$_{d9}$ B$_{10}$ B$_{d10}$ P$_{11}$ P$_{d11}$ B$_{12}$ B$_{d12}$ B$_{13}$ B$_{d13}$ P$_{14}$ P$_{d14}$

FIG. 4E

GOP$_1$:   B$_0$ B$_d$ B$_1$ B$_{d1}$ I$_2$P$_2$ P$_{d2}$ B$_3$ B$_{d3}$ B$_4$ B$_{d4}$ P$_5$ P$_{d5}$ B$_6$ B$_{d6}$ B$_7$
GOP$_2$:   B$_{d7}$ I$_8$ P$_8$ P$_{d8}$ B$_9$ B$_{d9}$ B$_{10}$ B$_{d10}$ P$_{11}$ P$_{d11}$ B$_{12}$ B$_{d12}$ B$_{13}$ B$_{d13}$ P$_{14}$ P$_{d14}$

FIG. 4F

GOP$_1$:   B$_0$ B$_d$ I$_1$P$_1$ B$_{d1}$ B$_2$ P$_{d2}$ B$_3$ B$_{d3}$ P$_4$ B$_{d4}$ B$_5$ P$_{d5}$ B$_6$ B$_{d6}$ P$_7$
GOP$_2$:   B$_{d7}$ B$_8$ I$_{d8}$P$_{d8}$ B$_9$ B$_{d9}$ P$_{10}$ B$_{d10}$ B$_{11}$ P$_{d11}$ B$_{12}$ B$_{d12}$ P$_{13}$ B$_{d13}$ B$_{14}$ P$_{d14}$

FIG. 4G $GOP_1$: $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $P_{14}$

FIG. 5B $GOP_1$: $B_0$ $B_1$ $I_2P_2$ $B_3$ $B_4$ $P_5$ $B_6$ $B_7$ $P_8$ $B_9$ $B_{10}$ $P_{11}$ $B_{12}$ $B_{13}$ $P_{14}$

FIG. 5C $GOP_1$: $B_0$ $B_1$ $I_2P_2$ $B_3$ $B_4$ $P_5$ $B_6$ $B_7$ $I_8$ $P_8$ $B_9$ $B_{10}$ $P_{11}$ $B_{12}$ $B_{13}$ $P_{14}$

FIG. 5D $GOP_1$: $B_0$ $B_d$ $B_1$ $B_{d1}$ $I_2P_2$ $P_{d2}$ $B_3$ $B_{d3}$ $B_4$ $B_{d4}$ $P_5$ $P_{d5}$ $B_6$ $B_{d6}$ $B_7$ $B_{d7}$ $I_8$ $P_8$ $P_{d8}$ $B_9$ $B_{d9}$ $B_{10}$ $B_{d10}$ $P_{11}$ $P_{d11}$ $B_{12}$ $B_{d12}$ $B_{13}$ $B_{d13}$ $P_{14}$ $P_{d14}$

FIG. 5E $GOP_1$: $B_0$ $B_d$ $B_1$ $B_{d1}$ $I_2P_2$ $P_{d2}$ $B_3$ $B_{d3}$ $B_4$ $B_{d4}$ $P_5$ $P_{d5}$ $B_6$ $B_{d6}$ $B_7$
$GOP_2$: $B_{d7}$ $I_8$ $P_8$ $P_{d8}$ $B_9$ $B_{d9}$ $B_{10}$ $B_{d10}$ $P_{11}$ $P_{d11}$ $B_{12}$ $B_{d12}$ $B_{13}$ $B_{d13}$ $P_{14}$ $P_{d14}$

FIG. 5F $GOP_1$: $B_0$ $B_d$ $I_1P_1$ $B_{d1}$ $B_2$ $P_{d2}$ $B_3$ $B_{d3}$ $P_4$ $B_{d4}$ $B_5$ $P_{d5}$ $B_6$ $B_{d6}$ $P_7$
$GOP_2$: $B_{d7}$ $B_8$ $I_{d8}P_{d8}$ $B_9$ $B_{d9}$ $P_{10}$ $B_{d10}$ $B_{11}$ $P_{d11}$ $B_{12}$ $B_{d12}$ $P_{13}$ $B_{d13}$ $B_{14}$ $P_{d14}$

FIG. 5G $GOP_1$: $B_0$ $B_1$ $I_2P_2$ ___ ___ ___ $B_3$ ___ $B_4$ ___ $P_5$ $B_6$ $B_7$ ___
$GOP_2$: ___ ___ $I_8$ $P_8$ $B_9$ ___ ___ $B_{10}$ ___ $P_{11}$ ___ $B_{12}$ ___ ___ $B_{13}$ $P_{14}$

FIG. 5H $GOP_1$: $B_0$ $B_1$ $I_2P_2$ $B_d$ $B_d$ $P_d$ $B_3$ $B_d$ $P_d$ $B_4$ $B_d$ $P_5$ $B_6$ $B_7$ $P_d$
$GOP_2$: $B_d$ $B_d$ $I_8$ $P_8$ $B_9$ $B_d$ $P_d$ $B_{10}$ $B_d$ $P_{11}$ $B_d$ $B_{12}$ $P_d$ $B_d$ $B_{13}$ $P_{14}$

FIG. 5I

GOP$_1$:  B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$
GOP$_2$:  B$_{15}$ B$_{16}$ I$_{17}$ B$_{18}$ B$_{19}$ P$_{20}$ B$_{21}$ B$_{22}$ P$_{23}$ B$_{24}$ B$_{25}$ P$_{26}$ B$_{27}$ B$_{28}$ P$_{29}$

FIG. 6B

GOP$_{1+2}$:  I$_2$ B$_3$ P$_5$ P$_8$ B$_9$ P$_{11}$ B$_{13}$ P$_{14}$ B$_{16}$ I$_{17}$ P$_{20}$ B$_{21}$ P$_{23}$ B$_{24}$ P$_{26}$ B$_{28}$ P$_{29}$

FIG. 6C

GOP$_1$:  B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$
GOP$_2$:  B$_{15}$ B$_{16}$ I$_{17}$ B$_{18}$ B$_{19}$ P$_{20}$ B$_{21}$ B$_{22}$ P$_{23}$ B$_{24}$ B$_{25}$ P$_{26}$ B$_{27}$ B$_{28}$ P$_{29}$

FIG. 6D

GOP$_{1+2}$:  B$_0$ I$_2$ B$_4$ B$_6$ P$_8$ B$_{10}$ B$_{12}$ P$_{14}$ B$_{16}$ B$_{18}$ P$_{20}$ B$_{22}$ B$_{24}$ P$_{26}$ B$_{28}$

FIG. 6E

GOP$_{1+2}$:  B$_0$ B$_2$ I$_4$ B$_6$ B$_8$ P$_{10}$ B$_{12}$ B$_{14}$ P$_{16}$ B$_{18}$ B$_{20}$ P$_{22}$ B$_{24}$ B$_{26}$ P$_{28}$

FIG. 6F

GOP$_1$:   B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$
GOP$_2$:   B$_{15}$ B$_{16}$ I$_{17}$ B$_{18}$ B$_{19}$ P$_{20}$ B$_{21}$ B$_{22}$ P$_{23}$ B$_{24}$ B$_{25}$ P$_{26}$ B$_{27}$ B$_{28}$ P$_{29}$

FIG. 7B

GOP$_1$:   B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$
GOP$_2$:   B$_{15}$ B$_{16}$ I$_{17}$ B$_{18}$ B$_{19}$ P$_{20}$ B$_{21}$ B$_{22}$ P$_{23}$ B$_{24}$ B$_{25}$ P$_{26}$ B$_{27}$ B$_{28}$ P$_{29}$

FIG. 7C

GOP$_{1+2}$:   B$_0$ B$_1$ I$_2$ B$_3$ B$_4$ P$_5$ B$_6$ B$_7$ P$_8$ B$_9$ B$_{10}$ P$_{11}$ B$_{12}$ B$_{13}$ P$_{14}$ B$_{15}$ B$_{16}$ I$_{17}$ B$_{18}$ B$_{19}$ P$_{20}$ B$_{21}$
B$_{22}$ P$_{23}$ B$_{24}$ B$_{25}$ P$_{26}$ B$_{27}$ B$_{28}$ P$_{29}$

FIG. 7D

CHANGING A PLAYBACK SPEED FOR VIDEO PRESENTATION RECORDED IN A PROGRESSIVE FRAME STRUCTURE FORMAT

CROSS REFERENCE TO RELATED APPLICATION (Not Applicable)

STATEMENT REGARDING FEDERALLY SPONSORED RESEARCH OR DEVELOPMENT (Not Applicable)

BACKGROUND OF THE INVENTION

1. Technical Field

The inventive arrangements relate generally to methods and apparatus providing advanced operating features for programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also generally used to refer to write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

Once video is recorded onto a disc, a user may desire to change the speed at which the video is displayed. To meet this demand, most conventional DVD recorders are designed to playback the video at different speeds. For example, these devices can generally playback video at fast-forward or slow-motion speed. These playback variations are commonly referred to as trick modes. Typically, a DVD recorder performs these trick modes by repeating or deleting one or more pictures contained in the recorded video after the video has been read from the disc. For example, in the slow motion trick mode, a DVD recorder can repeat every picture from a particular portion of recorded video to give the viewer the impression that the video is being displayed at one-half its normal speed. To produce fast-forward playback, the DVD recorder can delete one or more pictures from the video during playback.

While trick modes enable a user to view recorded video at different speeds, the video is not permanently altered by the process. If the video is displayed at a later time, then the user must initiate another trick mode to view the video at a different speed. Significantly, however, many users may wish to permanently change the playback speed of a particular portion of video by modifying the video once the video has been recorded onto a disc. Such a process can permit speed variations during playback without the user invoking a trick mode command. Unfortunately, several significant obstacles exist that make editing recorded video in such a fashion impracticable. Specifically, the space occupied by the original video is not large enough to store the pictures that must be repeated in order to produce slow motion playback. In addition to spatial limitations, repeating pictures on the disc can interfere with the conventional picture structure of the video, which can degrade the display quality of the video during playback.

Modifying recorded video to produce fast-forward playback, however, is not affected by the spatial limitations that impede slow-motion editing. This is because fast-forward editing merely deletes pictures form the recorded video. Nevertheless, creating fast-forward video, similar to slow-motion modification, also negatively impacts the conventional picture structure of the video. Thus, what is needed is a device that can change the playback speed of recorded video yet can overcome the spatial and structural limitations associated with such recorded video.

SUMMARY OF THE INVENTION

In a rewritable storage medium, the invention includes a method for changing a playback speed of a selected video segment having a progressive frame structure which has been recorded on a portion of the storage medium. In one arrangement, the invention includes the steps of: modifying the selected video segment for a changed playback speed; and recording the modified video segment exclusively on the portion of the medium. The invention can also include the step of deleting a plurality of non-video packs in the selected video segment to reduce the amount of data contained in the modified video segment. Further, the invention can also include the step of reducing a resolution of at least one frame contained in the modified video segment. The invention can also include the step of lowering a bit rate of the modified video segment during the recording step.

In one arrangement of the above invention, the video segment can be comprised of intra and non-intra frames and the modification can comprise the step of decoding each intra frame and selectively decoding at least one non-intra frame. The invention can also include the step of inserting into the selected video segment at least one of the group consisting of dummy pictures and repeat pictures. In one aspect, the number of dummy pictures and repeat pictures inserted into the selected video segment can be based on the changed playback speed. In another arrangement, the invention can also include the step of selectively decoding and re-encoding the modified video segment for conventional placement of the dummy pictures, the repeat pictures, and the intra and non-intra frames.

In another arrangement of the above method, the video segment can include intra and non-intra frames and the modification can include the step of decoding all intra and non-intra frames. In addition, in this arrangement, the invention can include the step of inserting at least one of the group consisting of dummy pictures and repeat pictures into the selected video segment. In another aspect, the number of dummy pictures and repeat pictures inserted into the selected video segment can be based on the changed playback speed.

In another arrangement of the above method, the video segment can include intra and non-intra frames and the modification can include the step of removing at least one frame from the group consisting of intra and non-intra frames. Alternatively, the video segment can include intra and non-intra frames and the modification can include the steps of: decoding the intra and non-intra frames; and removing at least one field from at least one of the intra and non intra frames.

In another arrangement, the invention includes a system for changing a playback speed of a selected video segment having a progressive frame structure recorded on a rewritable storage medium. The above system includes: storage medium reading circuitry for selectively reading a video segment which has been recorded on a portion of the rewritable storage medium; and a video processor for modifying the selected video segment for a changed playback speed; and video recorder circuitry for recording the modified video segment exclusively on the portion of the storage medium. In one aspect, the video processor can delete a plurality of non-video packs in the selected video segment to reduce the amount of data contained in the modified video segment. Further, the video processor can reduce the resolution of at least one frame contained in the modified video segment and can lower the bit rate of the modified video segment during the recording step.

In one arrangement of the above system, the video segment can include intra and non-intra frames, and the video processor can decode each intra frame and can selectively decode at least one non-intra frame. In addition, the video processor can insert into the selected video segment at least one of the group consisting of dummy pictures and repeat pictures. Further, the number of dummy pictures and repeat pictures inserted into the selected video segment can be based on the changed playback speed. In addition, the video processor can selectively decode and reencode the modified video segment for conventional placement of the dummy pictures, the repeat pictures and the intra and non-intra frames.

In another arrangement of the above system, the video segment can include intra and non-intra frames and the video processor can decode all the intra and non-intra frames. Further, the video processor can insert at least one of the group consisting of dummy pictures and repeat pictures into the selected video segment. In this particular arrangement, the number of dummy pictures and repeat pictures inserted into the selected video segment can be based on the changed playback speed.

In another aspect of the above system, the video segment can include intra and non-intra frames and the video processor can remove at least one frame from the group consisting of the intra and non-intra frames. Alternatively, the video processor can: decode the intra and non-intra frames; and remove at least one field from at least one of the intra and non-intra frames.

BRIEF DESCRIPTION OF THE DRAWINGS

FIGS. 4B–4G demonstrate the editing process of FIG. 4A as applied to a conventional GOP to produce a one-half playback speed.

FIGS. 5B–5I demonstrate the editing process of FIG. 5A as applied to two conventional GOP's to produce a one-half playback speed.

FIGS. 6B–6F demonstrate the editing process of FIG. 6A as applied to two conventional GOP's to produce a doubled playback speed.

FIGS. 7B–7D demonstrate the editing process of FIG. 7A as applied to two conventional GOP's to produce a doubled playback speed.

DETAILED DESCRIPTION OF THE PREFERRED EMBODIMENTS

Recordable DVD Device

Figure 1:
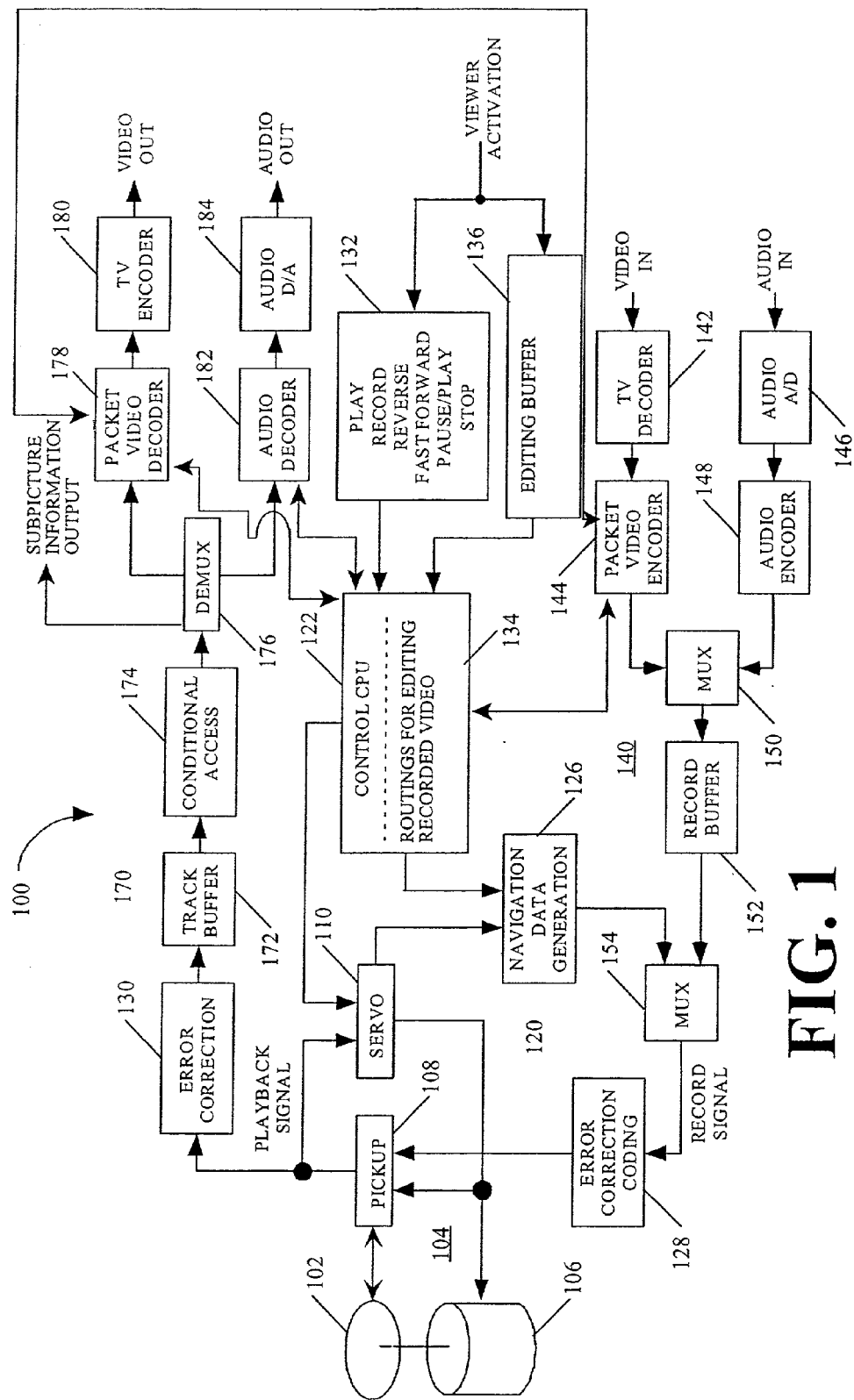
FIG. 1 is a block diagram of a rewritable DVD device that can change the playback speed of video recorded in a progressive frame structure format in accordance with the inventive arrangements herein.

A device 100 for implementing the various advanced operating features in accordance with the inventive arrangements is shown in block diagram form in FIG. 1. A rewritable disc medium is embodied as a rewritable DVD in the illustrated embodiment. In many instances, as will be noted, the rewritable disc medium can also be, for example, a hard drive or a magneto optical disc (MOD). An example of a MOD is a mini-disc. Moreover, the invention can be used in a digital tape machine. In fact, the invention can be used in any other suitable storage medium device.

The device 100 is capable of writing onto and reading from the disc medium, in this example, a rewritable DVD 102. Although the following discussion primarily concerns a rewritable DVD, the invention is not so limited. As noted earlier, the invention can be used with any other suitable storage medium. The device can comprise a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 can include a motor 106 for spinning the disc 102 and a pickup assembly 108 that can be adapted to be moved over the disc 102 as the disc 102 spins. A laser on the pickup assembly 108 can burn spots onto a spiral track on the disc 102 and can illuminate spots already burned onto the track for recording and playing back video and/or audio program material. For purposes of understanding the invention, it is irrelevant whether the disc 102 is recordable on one or two sides, or in the event of a double-sided recording, whether the double-sided recording, or subsequent reading from the disc 102, takes place from the same side of the disc 102 or from both sides. The pickup assembly 108 and the motor 106 can be controlled by a servo 110. The servo 110 can also receive the Playback Signal of data read from the spiral track of the disc 102 as a first input.

The Playback Signal is also an input to an error correction circuit 130, which can be considered part of the control section or part of the video/audio output processing path 170.

The control section 120 can comprise a control central processing unit (CPU) 122 and a navigation data generation circuit 126. The control CPU 122 can supply a first input signal to the navigation data generation circuit 126, and the servo 110 can supply a second input signal to the navigation data generation circuit 126. The servo 110 can also be considered part of the control section 120. The navigation data generation circuit 126 can supply a first input signal to the multiplexer (MUX) 154, which can form part of the video/audio input processing path 140.

The output of the MUX 154 can be an input to an error correction coding circuit 128. The output of the error correction coding circuit 128 can be a recordable input signal supplied to the pickup 108, which can be "burned" onto the spiral track of the disc 102 by the laser.

In addition, control and data interfaces can also be provided for permitting the CPU 122 to control the operation of the video encoder 144, video decoder 178 and audio decoder 182. Suitable software or firmware can be provided in memory for the conventional operations performed by control CPU 122. Further, program routines for the editing recorded video features 134 are provided for controlling CPU 122 in accordance with the inventive arrangements. A control buffer 132 for viewer activatable functions can indicate those functions presently available, namely play, record, reverse, fast forward, slow play, jump, pause/play and stop. In addition, an editing buffer 136 can be provided to receive commands for implementing the recorded video editing features.

The output processing path 170 can comprise an error correction block 130, a track buffer 172, a conditional access circuit 174 and a demultiplexer 176. The track buffer 172 can read and temporarily store for further processing data read from the disc 102. This data can be processed by the conditional access circuit 174, which can control propagation of the data through the demultiplexer 176 and into respective paths for video and audio processing. Additionally, the output processing path 170 can include a packet video encoder 178, a TV encoder 180, an audio decoder 182 and an audio D/A 184.

The video/audio input processing path 140 can be a signal processing circuit for converting a conventional television signal into digitized packet data for digital recording by the device 100. The input path 140 can include a TV decoder 142 and the packet video encoder 144. In addition, the input processing path 140 can include an audio A/D 146 and an audio encoder 148. During normal operation, the digitized signals can be combined in a multiplexer 150 and can then be stored in the record buffer 152 until an entire packet has been constructed. As groups of audio and video data packets are created, they can be combined in multiplexer 154 with appropriate navigation packets generated in the navigation generation block 126. The packets can then be sent to the error correction coding circuit 128. Error correction coding circuit 128 can also be deemed to be part of the input path 140.

If a user wishes to edit a portion of video stored on the disc 102, the editing buffer 136 can signal the control CPU 122. In one arrangement, the control CPU 122 can signal the packet video encoder 178 to decode the pictures contained in the video and then to send the video containing the decoded pictures to a packet video encoder 144. As will be explained later, in an alternative arrangement, only a selected number of these pictures need to be decoded during the editing process. In either arrangement, any audio associated with the pictures can be forwarded to the audio decoder 182. The control CPU 122 can then instruct the audio decoder 182 to store the audio temporarily. For purposes of creating extra space, however, the audio is generally not recombined with the video during the editing process. Rather, the audio is typically lost when the storage buffer in the audio decoder 182 overflows. Conversely, once the editing process is completed, any audio associated with the edited video that remains in the audio decoder's 182 storage buffer can be overwritten with audio intended to be played. In addition to removing the audio component, any subpicture information associated with the modified video can be separated and prevented from reintegrating with the modified video.

Once the video signal containing the decoded pictures is received at the packet video encoder 144, the video encoder 144 can modify the video signal by adding or deleting pictures. As will be explained in detail below, adding pictures to the video signal can create slow-motion video and deleting pictures from the video can produce fast-forward video. The video encoder 144 can then re-encode these pictures so that the modified video can be placed on the disc 102.

After the pictures in the edited video signal have been re-encoded, the video signal can merely propagate through the multiplexer 150 since audio is typically not combined with the modified video signal. The edited video is then processed in a fashion similar to that of normal video. That is, the modified video signal is combined with navigation data in the multiplexer 154 and error corrected by error correction coding circuit 128. As will be explained later, the edited video signal can then be recorded back onto the disc 102 in its original space.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
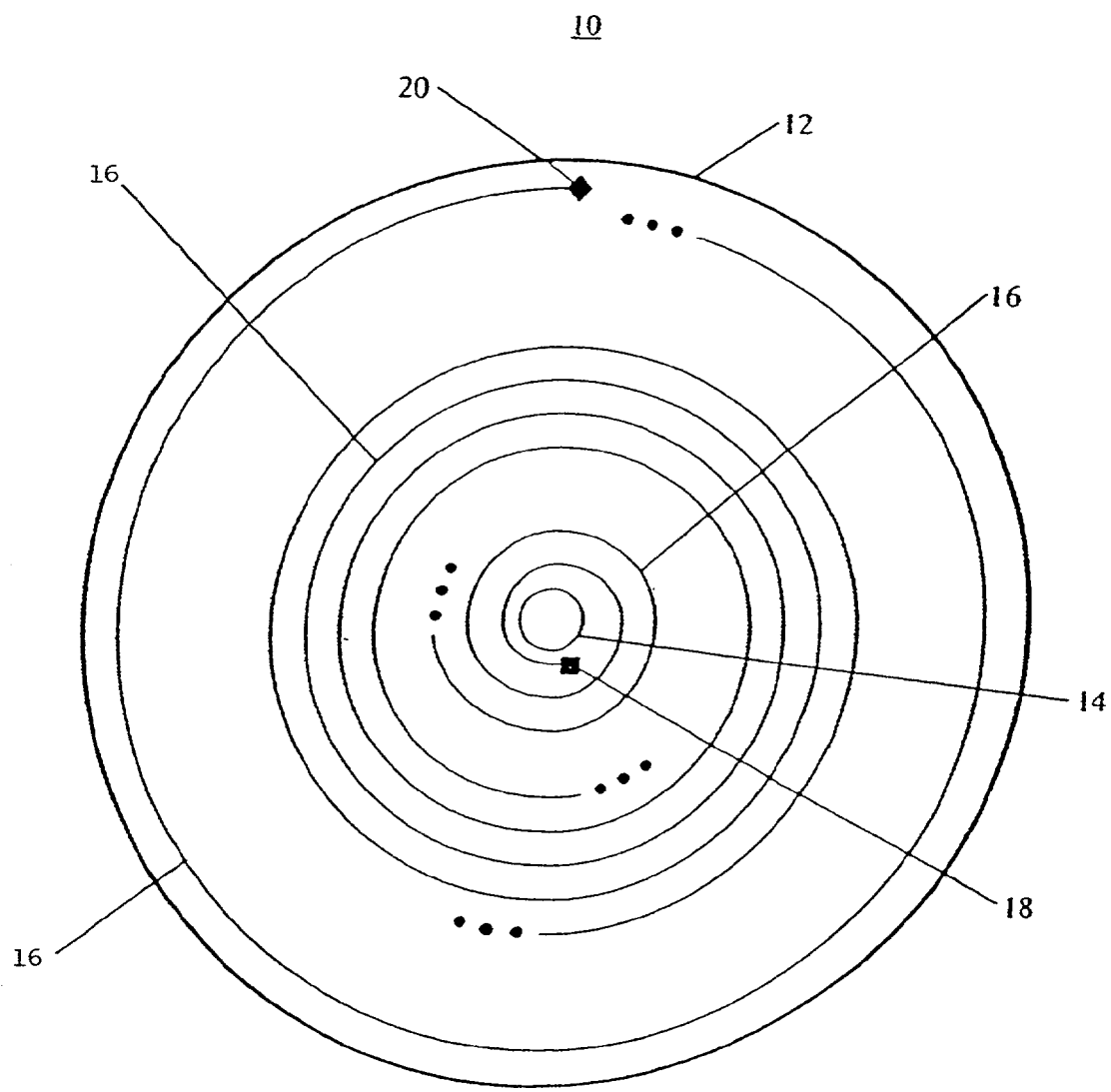
FIG. 2 illustrates the spiral track on a rewritable DVD disc.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12. The re-writable DVD can consist of two substrates bonded together by an adhesive layer forming a 1.2 mm thick disk. A center hole 14 can be formed in the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (•••) denote portions of the track not shown in the drawing. As a result, the begining of the spiral track is deemed to be near the hole 14 and is denoted by square 18. The end of the spiral is deemed to end near the rim and is denoted by diamond 20. Those skilled in the art generally accept defining the beginning and end of the spiral as noted. The track can also have a side-to-side wobble, not shown in the drawing, to accommodate media type indexing. Due to difficulties of scale, only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

DVD Data Structure

Figure 3:
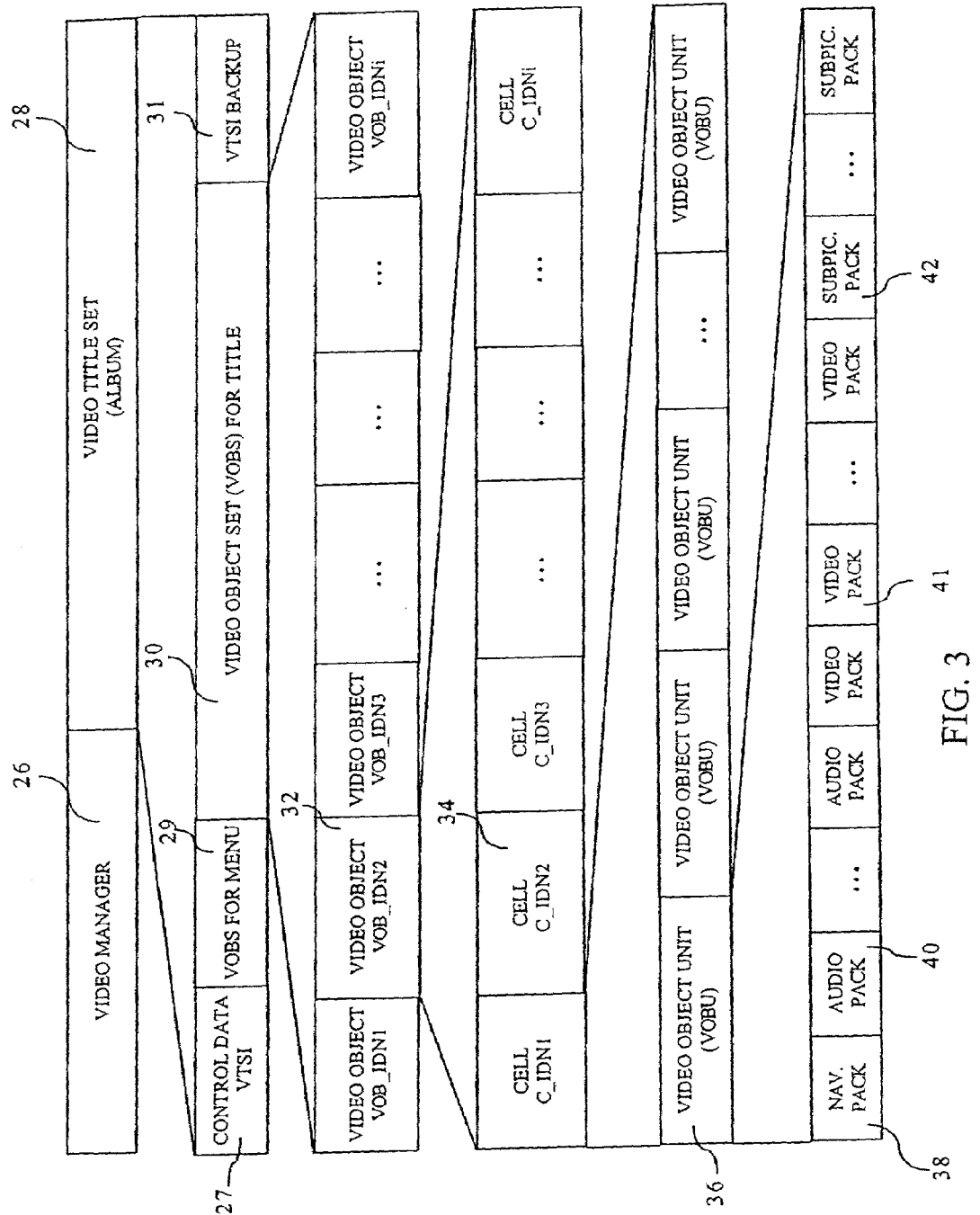
FIG. 3 illustrates a data structure of the rewritable DVD disc of FIG. 2.

As shown in FIG. 3, each DVD contains a video manager 26 and a video title set (VTS) 28. The VTS includes video title set information (VTSI) 27, an optional video object set for menu 29, one or more VOBS for title 30 which contains the actual title content and a VTS1 backup 31. Each VOBS 30 is comprised of a plurality of video objects (VOB) 32. Each video object 32 includes a plurality of cells 34. Each VOBS 30 also includes a collection of pointers to one or more cells. In this way, the VOBS 30 data links the cells 34 together and indicates in what order the programs or cells 34 are to be played. The cells 34 within a particular VOBS 30 can be flagged for play in any desired order. For example, they can be played sequentially or randomly.

Each cell 34 includes a plurality of video object units (VOBU) 36. Each of the VOBU's 36 in which the video content of the disc resides typically contains 0.4 to 1.0 seconds of presentation material. Each VOBU starts with exactly one navigation pack (NV_PCK) 38 and can include one or more audio packs (A_PCK) 40, one or more video packs (V_PCK) 41 and one or more subpicture packs (SP_PCK) 42. In addition, each VOBU 36 is nominally comprised of one group of pictures (GOP).

Changing Playback Speed for Video Presentation Recorded in a Progressive Frame Structure Format In accordance with the inventive arrangements, a user may alter the playback speed of progressive frame video that has already been recorded onto a storage medium. If the user desires to edit the recorded video to produce slow motion video, then one or more pictures may be inserted into the video to create such an effect. The altered video can then be recorded onto the storage medium in the same space previously occupied by the original video. If the user desires to create fast-forward video, then one or more pictures may be removed from the recorded video. Similar to the slow motion editing process, the video can be recorded in the original video's medium space. In either process, the edited video may be re-encoded to produce higher quality playback and trick mode operation.

The following is a typical GOP structure in an MPEG video stream recorded under a progressive scanning format, which can be helpful in explaining the inventive arrangements:

$B_0 \; B_1 \; I_2 \; B_3 \; B_4 \; P_5 \; B_6 \; B_7 \; P_8 \; B_9 \; B_{10} \; P_{11} \; B_{12} \; B_{13} \; P_{14}$

As shown, MPEG video generally uses three types of picture storage methods: Intra (I) frames, predicted (P) frames and bidirectional predicted (B) frames. The P frames and B frames are commonly referred to as non-intra (non-I) frames. I frames are encoded or decoded independent of any other picture. This creates a reference frame from which non-I frames can be constructed. To reduce the amount of information needed to be encoded in a particular GOP, each GOP usually contains only one I frame.

P frames contain motion vectors which describe the difference from the closest previous I frame or P frame. In contrast to I frames, only the differences between the current P frame and the closest previous I frame or P frame are encoded. B frames contain motion vectors that describe the difference from the closest previous I frame or P frame as well as the closest subsequent I frame or P frame. Similar to P frames, only the differences between the current B frame and the relevant I frames or P frames are encoded or decoded.

Although a GOP can contain from one to eighteen pictures, a typical GOP comprises fifteen frames. Moreover, placing two B frames between each I frame and P frame or between a P frame and another P frame produces smoother playback in addition to improved trick mode performance. As a result, it is desirable to have each GOP in a video signal in conformity with the conventional GOP structure reproduced above, particularly if the video is to be recorded back onto a suitable storage medium.

It should be noted, however, that the GOP structure selected for purposes of illustrating the inventive arrangements herein is merely an example of a GOP structure that can be used to practice the invention, as the invention is not limited to any particular type of GOP structure. In fact, the invention can be applicable to those MPEG encoders that are designed to create only P frames and I frames or those encoders that are limited to produce only I frames.

Figure 4A:
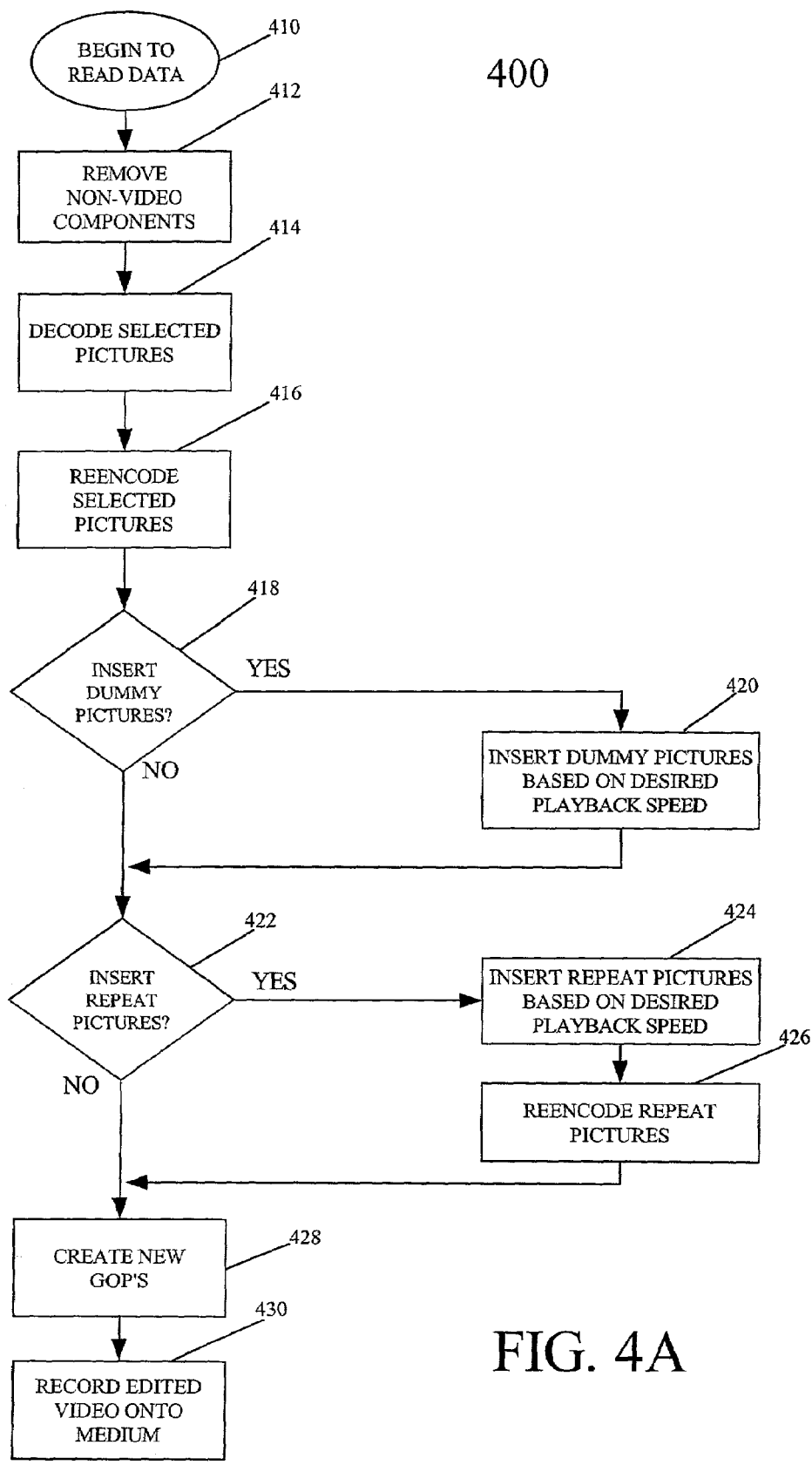
FIG. 4A is a flow chart that illustrates the operation of changing the playback speed of a video presentation recorded in a progressive frame structure format to produce slow motion playback.

Referring to FIG. 4A, a flowchart 400 illustrates how slow motion editing can be performed. In this arrangement, it is preferable to limit the number of pictures that are to be decoded and subsequently re-encoded. FIGS. 4B through 4G illustrate an example of this slow motion editing process. In particular, FIGS. 4B through 4G demonstrate how a single conventional GOP can be altered to produce a one-half playback speed; however, it should be noted that the invention is not so limited, as any portion of video may be changed to playback at any speed slower than normal playback.

Beginning at step 410 in FIG. 4A, the device 100 can begin to read data from the storage medium. In step 412, the demultiplexer 176 of FIG. 1 can separate the video component of the recorded video signal from the non-video components, such as A_PCK's 40 and SP_PCK's 42. The NV_PCK's 38, however, can be left in the video signal being edited. The non-video components can then be discarded. FIG. 4B illustrates a conventional GOP following this process.

As shown in step 414 and in accordance with the inventive arrangements, only a selected number of pictures need to be decoded. In one arrangement, each I frame in the video signal can be decoded. In addition, since adding pictures to the video signal to produce a slower playback will create the need to form new GOP's, one or more other non-I frames can be decoded thereby enabling such pictures to be re-encoded into I frames, or as will be explained below, I field and P field pictures. This procedure ensures that each new GOP will have at least one I frame, or at least one I field and P field combination, from which to produce the P and B frames.

At step 416, the pictures that were decoded in step 414 can now be re-encoded. As an example, the I frames that were decoded in step 414 can be re-encoded into an I field picture and a P field picture. This process is shown in FIG. 4C. As is known in the art, a complete frame includes two field pictures. Accordingly, an individual field picture will contain less information (approximately 50% less) than a complete frame. Re-encoding each I frame into two I field pictures does not necessarily reduce the amount of information that must be stored on the storage medium; however, re-encoding each I frame into an I field picture and a P field picture helps reduce the amount of information needed to be stored on the medium since a P field picture requires less storage space than an I field picture. It should be noted, however, that the invention is not so limited, as the I frames can be re-encoded into any other suitable format.

Any other pictures that were decoded in step 414 can be re-encoded into an I frame, or preferably, an I field picture and P field picture. This ensures that any new GOP's will have the necessary reference frame or fields to display the remaining P frames and B frames. FIG. 4D shows an example of this process, as frame $P_8$ is re-encoded into field pictures $I_8P_8$. It should be noted, however, that FIG. 4D is merely an example, as any other frame can be selected for decoding and subsequent re-encoding. Moreover, similar to the decoded and re-encoded I frames, any frames selected for decoding under this process are not limited to being re-encoded into I field and P field pictures, as such frames can be re-encoded into any other suitable format.

Moving to step 418 in FIG. 4A, if dummy pictures are to be added to the video being edited, then the packet video encoder 144 can insert one or more such pictures into the video signal, as shown at step 420. A dummy picture is an MPEG picture which is merely a repeat of a particular I frame or a non-I frame. Notably, however, the discrete cosine transform (DCT) coefficients and the motion vectors of the dummy picture are set to zero. Thus, dummy pictures require very little storage space on the medium. Further, dummy pictures are already in a compressed format and, therefore, do not have to be re-encoded prior to being recorded onto the storage medium.

In one arrangement, dummy pictures can be placed either before or after each frame in the video signal being altered; however, the invention is not so limited, as the dummy pictures can be inserted anywhere in the video signal. The number of dummy pictures inserted into the video signal depends on the selected slow motion speed. For example, a single dummy picture can be inserted either before or after each frame in the video signal, including each I frame that has been re-encoded into an I field and P field picture, to produce a playback speed that is one-half of normal playback speed. FIG. 4E illustrates this example. A slower playback speed requires the insertion of a greater number of dummy pictures.

The invention is not limited to adding dummy pictures to the video being edited to create slow motion playback. As shown in step 422, an alternative arrangement exists in which one or more repeat pictures can be inserted into the video signal for purposes of slow motion editing. A repeat picture is an uncompressed picture that is a duplicate of its parent picture.

If repeat pictures are to be added, then one or more such pictures can be inserted into the video being edited at step 424. Similar to the process of inserting dummy pictures, the number of repeat pictures added to the video can be determined by the desired playback speed, i.e., a slower playback speed requires a greater number of pictures to be added. Moreover, the repeat pictures can be inserted anywhere in the video being edited. As an example, FIG. 4E, in addition to illustrating the insertion of dummy pictures for a one-half speed playback, also represents the result of adding repeat pictures to produce a one-half speed playback. Once the repeat pictures are inserted, these pictures can be re-encoded, as shown at step 426. Thus, in accordance with the inventive arrangements, one or more dummy pictures, one or more repeat pictures or a combination thereof can be inserted into the video being edited to produce slow motion playback.

After the dummy and/or repeat pictures are placed in the video signal (and the repeat pictures re-encoded), one or more new GOP's can be created, as shown in step 428 in FIG. 4A. This is because the number of pictures in the portion of video being edited has increased, and industry standards limit the number of display fields that a GOP can contain to thirty-six. This equates to a maximum of eighteen frames per GOP. Although up to thirty-six fields, or eighteen frames, can be placed in either the original GOP or the newly created GOP's, an equal number of pictures is preferably placed in each GOP thereby enabling each GOP to undergo further processing, if desired, in order to conform to the conventional GOP structure. FIG. 4F shows an example of this result.

The new GOP's can now be recorded onto the storage medium, as shown in step 430. In accordance with the inventive arrangements, the edited video can be placed in the same space that the original video previously occupied. This is because any dummy pictures that have been placed in the video require very little storage space since they do not contain any encoded image information. Further, encoded repeat pictures typically contain only slight amounts of encoded information since they are identical or substantially identical to their parent pictures. Moreover, whatever storage space is required to fit these pictures into the original space can come from the space on the storage medium that was used to store the deleted non-video information.

In one arrangement, however, if there is not enough room on the storage medium, then a certain number of pictures that have not been re-encoded into I frames or I field and P field pictures can be decoded. Once decoded, these pictures can be re-encoded to reduce their picture resolution. Such a process reduces the amount of storage space required for the pictures. In an alternative arrangement, the bit rate of the video signal can be lowered as the video is being placed onto the storage medium. Although lowering the bit rate can result in the loss of some of the video data and a corresponding reduction in picture resolution, such a process enables the edited video signal to fit in the original recording location.

In an alternative embodiment, one or more of the GOP's containing the edited video can be re-encoded to match a conventional GOP structure. Re-encoding the new GOP's into a conventional GOP structure produces a smoother playback and improves trick mode performance. To do so, a number of the pictures in the GOP's can be decoded and then subsequently re-encoded into different formats. As an example, referring to FIG. 4F, $B_0$ and $B_d$ of $GOP_1$ do not have to be decoded and then re-encoded since a conventional GOP typically begins with two B frames. Continuing with the example, $B_t$, however, can be decoded and re-encoded into field pictures $I_1$ and $P_1$. These field pictures can now serve as the reference frame for $GOP_1$. This process can continue until the structure of the $GOP_1$ and $GOP_2$ matches a conventional structure, as shown in FIG. 4G. It should be noted, however, that the foregoing discussion is merely an example, as any other suitable sequence can be used to re-encode one or more of the GOP's in the edited video into conventional GOP's.

Figure 5A:
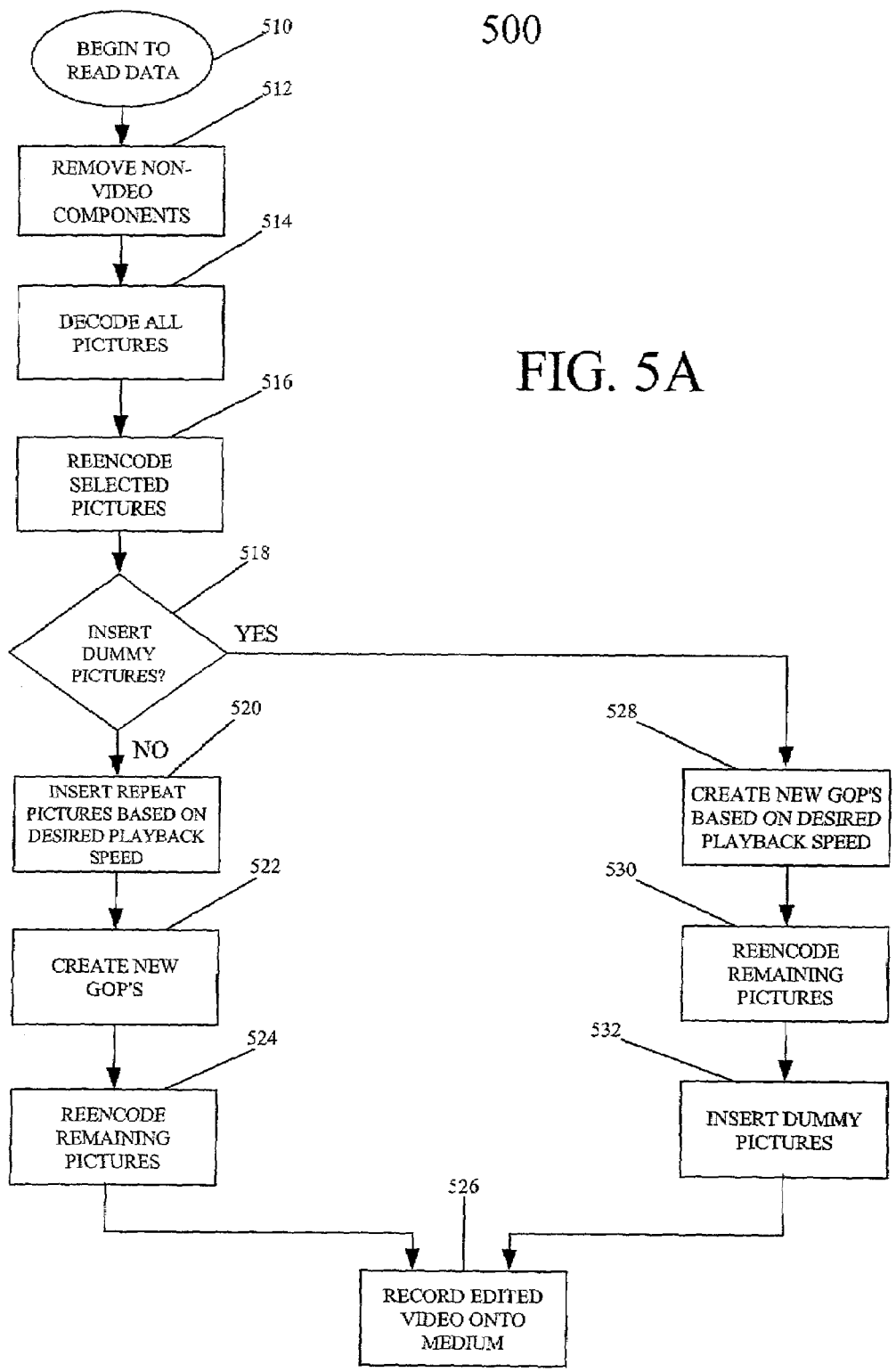
FIG. 5A is a flow chart that illustrates an alternative arrangement for changing the playback speed of a video presentation recorded in a progressive frame structure format to produce slow motion playback.

FIG. 5A shows a flowchart 500 that illustrates an alternative arrangement in which slow motion editing can be performed. FIGS. 5A through 5G illustrate an example of this type of editing. Similar to flowchart 400, data can be read form the storage medium at step 510 and non-video components can be removed from the video at step 512. FIG. 5B shows a GOP prior to being edited. In this arrangement, however, all the pictures can be decoded prior to adding dummy or repeat pictures, as shown in step 514. Once decoded, one or more of the I frames can be re-encoded into I and P field pictures, as shown in step 516 and FIG. 5C. Continuing with step 516, one or more other non-I frames may also be re-encoded into an I frame or I and P field pictures so that the new GOP's created by the editing process will each have a reference frame. FIG. 5D shows an example of this process.

Once the selected pictures have been re-encoded, dummy pictures may or may not be the pictures inserted into the video to be edited, as shown in step 518. If not, then, based on the desired playback speed, one or more repeat pictures can be inserted into the video at step 520. FIG. 5E illustrates an example of this process for one-half speed playback. Once the repeat pictures are inserted, new GOP's can be created, as shown at step 522 and illustrated in FIG. 5F. At step 524, the GOP's can then be re-encoded to match a conventional GOP structure. FIG. 5G shows an example of this process.

Moving back to step 518 of FIG. 5A, if dummy pictures are to be added to the edited video, then one or more new GOP's can be created based on the desired playback speed, as shown in step 528. FIG. 5H shows an example of this process. As pictured, two GOP's are created for purposes of producing one-half speed playback. A slower playback speed requires the creation of a greater number of GOP's. Each GOP can carry one or more of the frames from the video about to be edited. As will be explained below, it is preferable to place frames strategically such that inserting the dummy pictures can lead to a conventional GOP structure. It should be noted, however, that FIG. 5H is merely an example of this process, as the frames can be placed in any other suitable order.

Once the GOP's have been created, the original pictures in the video can be re-encoded, as illustrated at step 530. Subsequently, at step 432, one or more dummy pictures can then be added to the GOP's. Since they are already compressed, the dummy pictures do not have to be re-encoded. As shown in FIG. 5I, the type of dummy picture inserted in a specific location in a GOP is preferably a type that leads to the GOP having conventional GOP structure. For example, a dummy $B_d$ picture can be inserted between $B_4$ and $P_5$, as a conventional GOP typically contains two B pictures between I and P frames or between P frames. It should be noted, however, that the invention is not limited in this regard, as any other suitable insertion sequence can be used, including one that does not match a conventional GOP structure. Once the dummy pictures are added, at step 526, the edited video can be recorded on the storage medium.

Similar to the procedure of inserting pictures discussed in flowchart 400, the resolution of the pictures in the edited video signal can be reduced or the bit rate can be lowered if there is not enough room to fit the edited video in its original location on the storage medium. This applies to the process of adding repeat or dummy pictures.

Figure 6A:
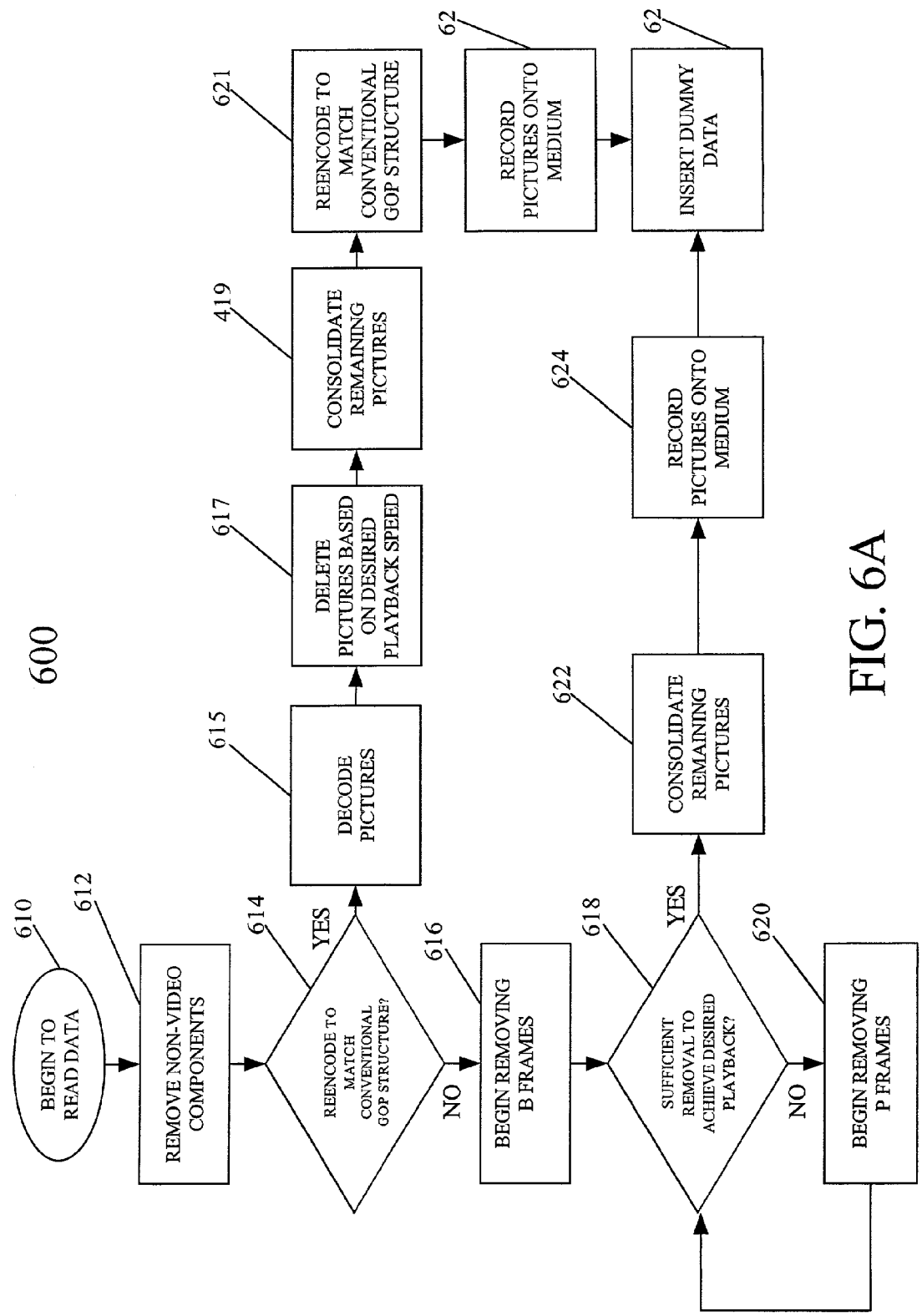
FIG. 6A is a flow chart that illustrates a process for changing the playback speed of a video presentation recorded in a progressive frame structure format to produce fast motion playback.

Referring to FIG. 6A, a flowchart 600 illustrates two ways how fast motion editing can be performed. FIGS. 6B through 6F illustrate an example of each of these fast motion editing processes as applied to two GOP's to create a double speed playback; however, it should be noted that the invention is not so limited, as any portion of video may be changed to playback at any speed faster than normal playback. In step 610, the device 100 can begin to read data from the storage medium. In step 612, the demultiplexer 176 of FIG. 1 can separate the video component of the recorded video signal from the non-video components, such as A_PCK's 40 and SP_PCK's 42. The non-video components can then be discarded. Similar to the slow motion process of FIGS. 4A and 5A, the NV_PCK's 38 can be left in the video signal being edited. FIG. 6B shows two conventional GOP's as they enter the packet video encoder 144.

As shown in step 614, if the edited video will not undergo a re-encoding step to conform each edited GOP to a conventional GOP structure, then the packet video encoder 144 can begin to remove B frames from the video signal. This process is shown at step 616 in FIG. 6A and in FIG. 6C. Referring to FIG. 6C, it is preferable to remove B frames in a non-successive manner. That is, once a B frame is removed, the device 100 can then retain one or more B frames (based on the desired playback speed) before deleting another B frame. Deleting B frames nonsequentially will produce a smoother playback and trick mode performance. As an example, in FIG. 6C, frames $B_0$ and $B_1$ can be removed and then frame $B_3$ can be retained before frames $B_4$, $B_6$ and $B_7$ are deleted. Subsequently, frame $B_9$ can be retained and the deletion process can continue. It should be noted, however, that the example shown in FIG. 6C is not intended to limit the invention to this particular deletion sequence, as any other suitable deletion sequence may be used.

The overall number of pictures deleted from the video signal depends on the selected fast motion speed. For example, to produce a playback speed twice as fast as normal playback, one-half of the pictures contained in each GOP can be deleted from the video signal. This is the result achieved in FIG. 6C. At step 618 in FIG. 6A, the video encoder 144 can determine whether removal of the B frames was sufficient for purposes of producing the desired fast-forward playback speed. If not, then the video encoder 144 can begin to remove P frames from the video, as shown in step 620. In one arrangement, the first P frame to be removed can be the last P frame contained in each GOP being edited; however, the invention is not so limited as any other P frame can be the first P frame deleted. As in the case of B frame removal, deletion of P frames is preferably done in a nonsequential order.

Once the proper number of pictures have been deleted, the remaining pictures from the edited GOP's can be consolidated to fill one or more of the GOP's contained in the edited video signal, in accordance with step 622 and as illustrated in FIG. 6C. These pictures can then be recorded onto the storage medium, as shown in step 624 in FIG. 6A. In contrast to the slow motion editing process, the fast-forward edited video can easily fit in its original storage medium space since one or more pictures have been deleted from the video. In one arrangement, dummy data can then be recorded over the remaining medium space, as shown in step 626. This process can prevent the recorder from displaying parts of the original video which still remain on that portion of the medium not receiving the edited video. The dummy data can conveniently be ignored by the device 100.

Turning back to step 614, if the edited GOP's are to be re-encoded to match the structure of a conventional GOP, then it is irrelevant as to which pictures are deleted from the video signal; however, similar to the previously discussed fast-forward editing process, it is preferable to delete frames in a nonsequential order for purposes of creating a smoother playback. FIG. 6D illustrates two GOP's before they are edited. Moving back to FIG. 6A, at step 615, the pictures that make up the video signal can be decoded by the packet video decoder 178 and can then be transferred to the packet video encoder 144. The packet video encoder 144 can then begin to remove pictures from the video, as shown in step 617. The number of pictures that are deleted can be based on the desired fast-forward playback speed. FIG. 6E illustrates this process as applied to two GOP's to produce a doubled playback speed. It should be noted, however, that the example shown in FIG. 6E is not intended to limit the invention to this particular deletion sequence, as any other suitable deletion sequence may be used to create the desired playback speed.

At step 619 of FIG. 6A, the remaining pictures can be consolidated, and these pictures can then be re-encoded to match the structure of a conventional GOP, as shown in step 621 of FIG. 6A and FIG. 6F. It should be noted, however, that the example shown in FIG. 6F is not intended to limit the invention to this particular re-encoding sequence, as any other suitable re-encoding sequence may be used. At step 623, once the pictures have been re-encoded, the pictures can be recorded onto the storage medium in the space previously occupied by the original video. In addition, dummy data can then be inserted into any remaining medium space, as shown in step 626.

Figure 7A:
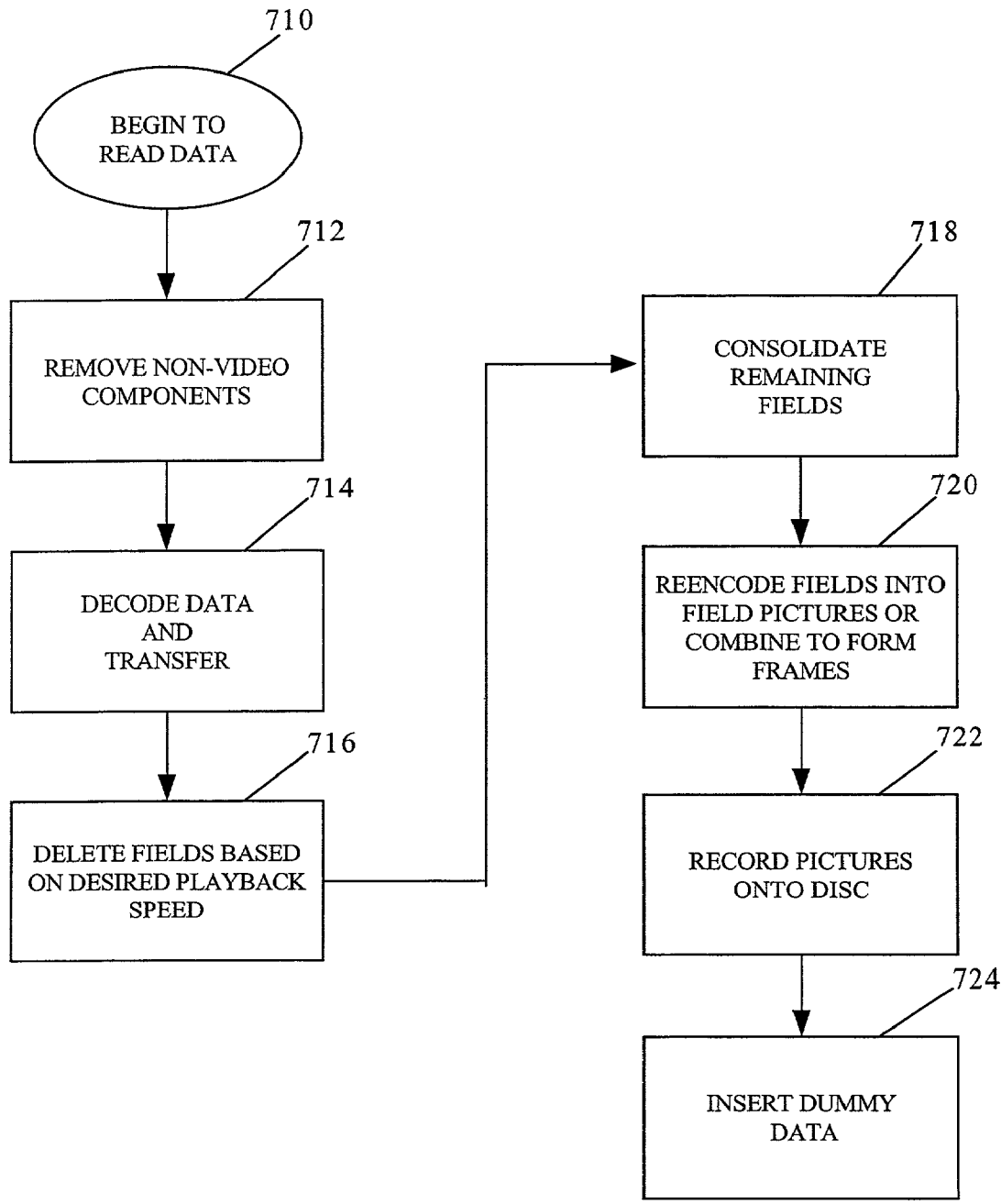
FIG. 7A is a flow chart that illustrates an alternative arrangement for changing the playback speed of a video presentation recorded in a progressive frame structure format to produce fast motion playback.

FIG. 7A is a flowchart 700 that illustrates another arrangement in which fast-forwarding editing can be performed. FIGS. 7B through 7D illustrate an example of this particular fast motion editing process as applied to two GOP's to create a double speed playback; however, it should be noted that the invention is not limited by this example, as any portion of video may be changed to playback at any speed faster than normal playback according to this particular arrangement. Similar to flowchart 600, in step 710 of FIG. 7A, the device 100 can begin to read data from the storage medium. In step 712, the demultiplexer 176 of FIG. 1 can separate the video component of the recorded video signal from the non-video components. The non-video components, except for any navigation data, can then be discarded. Next, the pictures that make up the video signal can be decoded by the packet video decoder 178 and can then be transferred to the packet video encoder 144, as shown in step 714. FIG. 7B illustrates two GOP's as they enter the video encoder 144.

In this arrangement, however, a number of fields can be deleted from the video signal based on the desired fast-forward playback speed, as shown in step 716 of FIG. 7A. FIG. 7C illustrates such a process where the desired playback speed is double that of normal playback speed. As pictured, a field has been removed from each frame that comprises the video signal. It should be noted, however, that FIG. 7C is merely an example, as any other playback speed can be achieved and any other suitable deletion sequence can be used to achieve a particular speed. Moreover, it is preferable, when applicable, to delete fields in a nonsequential manner.

As shown in step 718 of FIG. 7A and FIG. 7D, the remaining fields can then be consolidated, and at step 720 of FIG. 7A, these fields can be re-encoded. Similar to the fast-forward editing of FIG. 6A, the fields can be re-encoded to match the structure of a conventional GOP. The fields can be re-encoded into field pictures, as shown in FIG. 7D. Alternatively, the fields can be combined and re-encoded into non-progressive frames. The field pictures, or frames, can be recorded onto the storage medium in the space previously occupied by the original video, as shown in step 722. In addition dummy data can be inserted into any remaining space, as shown in step 724. Although any combination of field pictures may be removed to create the desired playback speed, removing field pictures as illustrated in FIGS. 7B through 7D will produce a smoother playback as well as improved trick mode performance.

We claim:

1. In a rewritable storage medium, a method for changing a playback speed of a selected video segment having a progressive frame structure which has been recorded on a portion of said storage medium comprising the steps of:
    modifying said selected video segment for a changed playback speed; and
    recording said modified video segment exclusively on said portion of said medium.

2. The method according to claim 1, further comprising the step of deleting a plurality of non-video packs in said selected video segment to reduce an amount of data contained in said modified video segment.

3. The method according to claim 1, further comprising the step of reducing a resolution of at least one frame contained in said modified video segment.

4. The method according to claim 1, further comprising the step of lowering a bit rate of said modified video segment during said recording step.

5. The method according to claim 1, wherein said video segment is comprised of intra and non-intra frames and said modification comprises the step of decoding each said intra frame and selectively decoding at least one said nonintra frame.

6. The method according to claim 5, further comprising the step of inserting into said selected video segment at least one of the group consisting of dummy pictures and repeat pictures, wherein the dummy pictures and the repeat pictures are duplicates of at least one of particular intra frames and particular non-intra frames in the selected video segment, the dummy pictures having discrete cosine transform (DCT) coefficients and motion vectors set to zero.

7. The method according to claim 6, wherein the number of said dummy pictures and said repeat pictures inserted into said selected video segment is based on said changed playback speed.

8. The method according to claim 7, further comprising the step of selectively decoding and re-encoding said modified video segment for conventional placement of said dummy pictures, said repeat pictures, and said intra and non-intra frames.

9. The method according to claim 1, wherein said video segment is comprised of intra and non-intra frames and said modification comprises the step of decoding all said intra and said non-intra frames.

10. The method according to claim 9, further comprising the step of inserting at least one of the group consisting of dummy pictures and repeat pictures Into said selected video segment, wherein the dummy pictures and the repeat pictures are duplicates of at least one of particular intra frames and particular non-intra frames in the selected video segment, the dummy pictures having discrete cosine transform (DCT) coefficients and motion vectors set to zero.

11. The method according to claim 10, wherein the number of said dummy pictures and said repeat pictures inserted into said selected video segment is based on said changed playback speed.

12. The method according to claim 1, wherein said video segment is comprised of intra and non-intra frames and said modification comprises the step of removing at least one frame from the group consisting of said intra and nonintra frames.

13. The method according to claim 1, wherein said video segment is comprised of intra and non-intra frames and said modification comprises the steps of:
   decoding said intra and non-intra frames; and
   removing at least one field from at least one of said intra and non-intra frames.

14. A system for changing a playback speed of a selected video segment having a progressive frame structure recorded on a rewritable storage medium, comprising:
   storage medium reading circuitry for selectively reading a video segment which has been recorded on a portion of said rewritable storage medium;
   a video processor for modifying said selected video segment for a changed playback speed; and
   video recorder circuitry for recording said modified video segment exclusively on said portion of said storage medium.

15. The system according to claim 14, wherein said video processor deletes a plurality of non-video packs in said selected video segment to reduce an amount of data contained in said modified video segment.

16. The system according to claim 14, wherein said video processor reduces a resolution of at least one frame contained in said modified video segment.

17. The system according to claim 14, wherein said video processor lowers a bit rate of said modified video segment during said recording step.

18. The system according to claim 14, wherein said video segment is comprised of intra and non-intra frames and said video processor decodes each said intra frame and selectively decodes said at least one said non-intra frame.

19. The system according to claim 18, wherein said video processor inserts into said selected video segment at least one of the group consisting of dummy pictures and repeat pictures, wherein the dummy pictures and the repeat pictures are duplicates of at least one of particular intra frames and particular non-intra frames in the selected video segment, the dummy pictures having discrete cosine transform (DCT) coefficients and motion vectors set to zero.

20. The system according to claim 19, wherein the number of said dummy pictures and said repeat pictures inserted into said selected video segment is based on said changed playback speed.

21. The system according to claim 20, wherein said video processor selectively decodes and re-encodes said modified video segment for conventional placement of said dummy pictures, said repeat pictures and said intra and non-intra frames.

22. The system according to claim 14, wherein said video segment is comprised of intra and non-intra frames and said video processor decodes all said intra and said non-intra frames.

23. The system according to claim 22, wherein said video processor inserts at least one of the group consisting of dummy pictures and repeat pictures into said selected video segment, wherein the dummy pictures and the repeat pictures are duplicates of at least one of particular ones of the intra frames and particular ones of the non-intra frames in the video segment, the dummy pictures having discrete cosine transform (DCT) coefficients and motion vectors set to zero.

24. The system according to claim 23, wherein the number of said dummy pictures and said repeat pictures inserted into said selected video segment is based on said changed playback speed.

25. The system according to claim 14, wherein said video segment is comprised of intra and non-intra frames and said video processor removes at least one frame from the group consisting of said intra and non-intra frames.

26. The system according to claim 14, wherein said video segment is comprised of intra and non-intra frames and said video processor:
   decodes said intra and non-intra frames; and
   removes at least one field from at least one of said intra and non-intra frames.

* * * * *